2,909,492

PREPARATION OF OXETANE POLYMERS

William M. Schilling, New Castle County, Del., assignor to Hercules Powder Company, Wilmington, Del., a corporation of Delaware No Drawing. Application June 15, 1954
Serial No. 436,990

6 Claims. (Cl. 260—2)

This invention relates to an improved process for the preparation of polymers of 3,3-bis(chloromethyl)oxetane.

Polymers of 3,3-bis(chloromethyl)oxetane are valuable, new synthetic polymeric materials for use in the production of plastic articles, films, filaments, etc. These polymers may be prepared by contacting 3,3-bis(chloromethyl)oxetane with a catalyst such as boron trifluoride or its molecular complexes in an inert organic solvent as the reaction medium. However, while high molecular weight polymers may be obtained when the polymerization is carried out in an organic solvent, the polymerization proceeds through a viscous solution or dope before the polymer starts to precipitate and at about 20–30% conversion, the reaction mixture takes on a rubbery consistency which makes both mixing and temperature control very difficult and may even, at high conversions, set to a complete solid or gel. Even if the reaction is carried out in fairly dilute solutions, the polymer separates in large and tough or rubbery lumps which must be shredded before the polymer can be purified, as, for example, treated with alcohol to destroy the catalyst, etc.

Now, in accordance with this invention, it has been found that the polymerization of 3,3-bis(chloromethyl)oxetane may be carried out by dispersing a solution of the monomer in an immiscible liquid diluent and then contacting the dispersion with the polymerization catalyst, as, for example, boron trifluoride. When the polymerization is carried out in this manner, that is, by a dispersion process, the polymerization takes place at a highly increased rate over that obtained by the usual solution processes and in addition, a more dense product is obtained. Another advantage in carrying out the polymerization in this manner is that the polymer is obtained in the form of dense spheres or beads which are easily processed. The polymer in this form is readily removed from the polymerization vessel, separated by filtration, washed, etc. The product so produced may then be used directly for many of the applications for which this polymer is used without further processing such as extrusion, etc.

The following examples will illustrate the improved process of polymerizing 3,3-bis(chloromethyl)oxetane in accordance with this invention. All parts and percentages are by weight unless otherwise indicated.

Example 1

Into a polymerization vessel cooled to —30° C. was charged 115 parts of sulfur dioxide, and 104 parts of 3,3-bis(chloromethyl)oxetane was then dissolved therein. To the cold solution was added 106 parts of hexane. The two-phase system was then agitated rapidly whereby a fine dispersion was formed. Boron trifluoride, 2.1 parts, was slowly added to the agitated suspension and agitation was continued for 2 hours, the polymerization mixture having become very thick at the end of 1 hour. On opening the polymerization vessel, it was found that some of the polymer was caked on the wall, but the solid was quite tender and readily broken up when mixed with methanol (280 parts). On filtering and drying there was obtained 80.2 parts of polymer, which was equivalent to a 77% conversion. It had a specific viscosity of 1.216 when measured as a 1% cyclohexanone solution at 50° C., and had a bulk density of 0.4. The polymer was composed of very uniform spheres of about 10–12 microns in diameter with a small percentage of agglomerates which ranged in size up to about 150 microns.

Example 2

3,3-bis(chloromethyl)oxetane (104 parts) was dissolved in 50 parts of liquid sulfur dioxide and 310 parts of hexane was added. The temperature was adjusted to —15° C. and the reaction mixture was agitated to form a dispersion. A stream of nitrogen was passed into the dispersion and into this nitrogen stream was introduced 2.0 parts of boron trifluoride gas during a five-minute period. An additional 0.5 part of boron trifluoride was introduced at the end of 15 minutes. Within 25 minutes the polymer had started to form and the temperature of the polymerization reaction mixture rose to —10° C., but again fell to —15° C. as the polymerization proceeded. On stopping agitation, the polymer rapidly settled to the bottom of the flask but was rapidly dispersed again when agitation was renewed. At the end of 2 hours, 80 parts of methanol was added to the polymerization mixture to destroy the catalyst. The polymer was removed by filtration, washed with methanol, and dried, whereby there was obtained 84 parts, which was equivalent to an 81% conversion. The polymer was in the form of irregularly shaped spheres. It had a bulk density of 0.555 and a specific viscosity, when measured as a 1% solution in cyclohexanone at 50° C., of 0.900.

Example 3

Into a polymerization vessel was charged 80 parts of liquid sulfur dioxide, 208 parts of 3,3-bis(chloromethyl)oxetane, and 330 parts of hexane. A dispersion was formed by agitating the reaction mixture rapidly. After cooling to —20° C., 4.0 parts of boron trifluoride was added to the reaction mixture during a period of 10 minutes. After 15 minutes an additional 3.0 parts of boron trifluoride was added. Within about 10 minutes the temperature rose to about —15° C., and after another 10 minutes had again dropped to —20° C. After 35 minutes total elapsed reaction time, there was added to the polymerization reaction mixture 16 parts of methanol. The polymer was separated from the reaction mixture by filtration, washed with alcohol and dried. The product so obtained amounted to 124 parts, which was equivalent to a 60% conversion. Of this, 116 parts was granular and 8 parts was recovered as a film from the walls of the vessel and agitator. The bulk density of the granular polymer was 0.46 and it had a specific viscosity of 1.217 when measured as a 1% solution in cyclohexanone at 50° C.

Example 4

Into a polymerization vessel was charged 270 parts of Deo-Base (a deodorized kerosene), 50 parts of anhydrous sulfur dioxide, and 130 parts of 3,3-bis(chloromethyl)oxetane, the temperature of the reaction vessel being held at —25° C. A fine dispersion was formed by means of rapid agitation, and with the temperature held at —25° C., 2.0 parts of boron trifluoride was added during a 15-minute period. Agitation was continued for 90 minutes, after which 240 parts of methanol was added. The polymer was removed by filtration, washed with methanol and dried, whereby there was obtained 124 parts, which was equivalent to a 95% conversion. The product was, for the most part, a granular, dense product. It had a specific viscosity of 0.468, when measured as a 1% solution in cyclohexanone at 50° C.

*Example 5*

A polymerization vessel was charged with 6.5 parts of 3,3-bis(chloromethyl)oxetane and 3.0 parts of a freshly distilled, alumina-treated 2,4-dimethylsulfolane. To the resulting solution were added 8.0 parts of hexane and 0.025 part of talcum powder. The mixture was cooled to $-20°$ C. and 2% by weight of boron trifluoride (based on the monomer) was added. After agitating the reaction mixture for 20 minutes, 30 parts of methanol was added and the polymer was obtained as a very fine powder. The product so obtained had a specific viscosity of 0.192, when measured as a 1% solution in cyclohexanone at 50° C.

In accordance with this invention it has been found that the polymerization of 3,3-bis(chloromethyl)oxetane may be carried out in a dispersion system wherein a solution of the monomer is dispersed in an inert, immiscible diluent. Any inert liquid solvent in which the 3,3-bis(chloromethyl)oxetane is soluble may be used for the preparation of the 3,3-bis(chloromethyl)oxetane solution provided that it is immiscible in the diluent in which the solution is to be dispersed. In the same way, any inert liquid diluent may be used as the medium in which the 3,3-bis(chloromethyl)oxetane solution is dispersed provided that it is immiscible with said solution so that the dispersion may be formed. Obviously, for either the solvent or diluent to be inert, it should be a diluent which is not a chain terminator for the polymerization or which inactivates or otherwise destroys the catalyst. Exemplary of the solvents that may be used to form the 3,3-bis(chloromethyl)oxetane solutions that are dispersed in the liquid diluents are liquid sulfur dioxide, sulfolanes (i.e., 2,3,4,5-tetrahydrothiophene-1,1-dioxides), as, for example, sulfolane, 2-methylsulfolane, 3-methylsulfolane, 2,4-dimethylsulfolane, etc., and any other solvent for 3,3-bis(chloromethyl)oxetane that is immiscible with the diluent in which the solution is to be dispersed. Exemplary of the diluents that may be used for the formation of the dispersion in accordance with this invention, and particularly in combination with the solutions of 3,3-bis(chloromethyl)oxetane in liquid sulfur dioxide or the sulfolanes, are hydrocarbons as, for example, aliphatic hydrocarbons such as ethane, propane, hexane, heptane, etc., or commercial mixtures thereof as may be found in kerosene, etc., cycloaliphatic hydrocarbons such as cyclopentane, cyclohexane, methylcyclohexane, etc. Any means of producing this dispersion may be used, but in general, it is simply obtained by rapidly agitating the mixture of the solution of the monomer and the immiscible diluent. However, in some cases it may be desirable to add an emulsifying agent or dispersant such as talc, kaolin, etc.

The concentration of the solution of the monomer that is dispersed in the immiscible diluent is not critical. While the 3,3-bis(chloromethyl)oxetane may be slightly soluble in some of the diluents that are used, as, for example, in aliphatic hydrocarbons, it is less soluble in such diluents than in a solvent such as liquid sulfur dioxide or the sulfolanes and may crystallize from the solution at the temperature at which the reaction is carried out. The sulfur dioxide, sulfolane or other solvent in which the 3,3-bis(chloromethyl)oxetane has an appreciable degree of solubility, however, functions to maintain the 3,3-bis(chloromethyl)oxetane in solution and at the same time obtain a two-phase system. For economic reasons it is desirable to use a concentrated solution of the 3,3-bis(chloromethyl)oxetane in sulfur dioxide. The concentration will, of course, depend to some extent on the temperature at which the polymerization reaction takes place since the solubility will decrease slightly as the temperature is lowered, even with such an excellent solvent as liquid sulfur dioxide. In general, the weight ratio of the monomer to solvent will be within the range of from about 15:1 to about 1:5, and preferably will be within the range of from about 6:1 to about 1:3. As previously pointed out, other ratios may be used if desired.

The ratio of the monomer solution to the immiscible diluent may also be varied widely. In general, a volume ratio of the monomer solution to the diluent phase may be used within the range of from about 5:1 to about 1:20, and preferably will be within the range of from about 1:1 to about 1:6. When the volume of immiscible diluent is greater than the volume of the monomer solution, a mobile polymer dispersion is obtained which is readily removed from the polymerization vessel.

The catalyst used in carrying out the polymerization of 3,3-bis(chloromethyl)oxetane in dispersed phase in accordance with this invention may be hydrogen fluoride, boron trifluoride, or a boron trifluoride complex. Among the boron trifluoride complexes that may be used are boron trifluoride etherates such as the complex of boron trifluoride with diethyl ether, etc., boron trifluoride—alkanoic acid complexes such as boron trifluoride—acetic acid complex (fluoroboroacetic acid), and any other complex of boron trifluoride with an organic compound, as, for example, acetic anhydride, acetonitrile, etc. The amount of catalyst used will depend upon the temperature at which the polymerization is carried out, the desired rate of polymerization, etc. In general, the amount of catalyst used will be within from about 0.02 to about 10% based on the monomer and preferably will be within from about 0.2 to about 7.5%.

The temperature at which the polymerization reaction is carried out may be varied over a wide range and will depend upon the desired rate of polymerization, concentration of the monomer solution, the pressure at which the polymerization is carried out, the solvent-diluent system that is used, etc. In general, the polymerization may be carried out within the range of from about $-80°$ C. to about 70° C. and preferably will be within the range of from about $-50°$ C. to about 35° C.

Many variations may be made in the operation of the process in accordance with this invention. For example, the reaction may be carried out at any desired pressure and the process may be operated as a batch or continuous process.

The polymer produced in accordance with this invention is in a form which is very easily processed. The reaction mixture is readily removed from the reaction vessel and the polymer is easily separated by filtration, centrifugation, etc. The catalyst is readily destroyed by the addition of methanol or other alcohol, water, etc., and thus the polymer is readily purified by washing with said alcohol. As may be seen from the foregoing examples, the polymer is produced in the form of very small spheres or beads which are easily handled and may be used directly in many applications.

In addition to obtaining a more dense polymer product than is obtained when a solution process is used, there are many other advantages in carrying out the polymerization by a dispersion technique. The power requirements to keep the polymerization mixture adequately agitated are low and conventional light-duty jacketed kettles may be used. As already pointed out, the reaction rate is much faster than when a solution process is used, chiefly because a higher concentration of the monomer is present in the polymerization phase. This higher concentration may be used because the immiscible diluent assists in heat dissipation. Many other advantages may be realized in carrying out the process by the dispersion technique in accordance with this invention.

What I claim and desire to protect by Letters Patent is:

1. In the process of preparing a polymer of 3,3-bis- (chloromethyl)oxetane by contacting a solution of 3,3-bis(chloromethyl)oxetane in a solvent of the group consisting of liquid sulfur dioxide and sulfolanes at a temperature of from about −80° C. to about 70° C. with a catalyst of the group consisting of hydrogen fluoride, boron trifluoride, and a molecular complex of boron trifluoride with a material of the group consisting of ethers, alkanoic acids and organic compounds, the improvement consisting essentially of dispersing said solution of 3,3-bis(chloromethyl)oxetane in an inert liquid organic diluent which is immiscible with said solution to form a two-phase system prior to contacting said solution with said catalyst, said diluent being inert as a chain terminator for the polymerization and inactive to destroy said catalyst, and thereafter contacting said solution in dispersed form in the two-phase system with said catalyst to form a polymer of 3,3-bis(chloromethyl)oxetane.

2. The process in accordance with claim 1 in which the inert liquid organic diluent is a hydrocarbon of the group consisting of aliphatic hydrocarbon and cycloaliphatic hydrocarbons.

3. The process in accordance with claim 2 in which the inert liquid organic diluent is hexane.

4. The process in accordance with claim 2 in which the inert liquid organic diluent is deodorized kerosene.

5. The process in accordance with claim 1 in which the catalyst in boron trifluoride.

6. The process in accordance with claim 1 in which the solvent for the 3,3-bis(chloromethyl)oxetane is liquid sulfur dioxide and the temperature is from about −50° C. to about 35° C.

References Cited in the file of this patent
UNITED STATES PATENTS

| | | |
|---|---|---|
| 2,097,263 | Strain | Oct. 26, 1937 |
| 2,722,520 | Hulse | Nov. 1, 1955 |